ULTRA-HIGH FREQUENCY VARIABLE REACTANCE

Filed Nov. 21, 1961 2 Sheets-Sheet 1

INVENTORS
BERNARD D. LOUGHLIN
CHARLES G. GORSS

BY [signature]

ATTORNEY

INVENTORS
BERNARD D. LOUGHLIN
CHARLES G. GORSS
BY [signature]
ATTORNEY 3,204,162

ULTRA-HIGH FREQUENCY VARIABLE REACTANCE

Bernard D. Loughlin, Centerport, N.Y., and Charles G. Gorss, Cedar Grove, N.J., assignors, by mesne assignments, to Hewlett-Packard Company, a corporation of California Filed Nov. 21, 1961, Ser. No. 153,945
3 Claims. (Cl. 317—251)

This invention relates to reactance standards and more particularly to a variable capacitor which operates at frequencies of the order of 600 megacycles.

Electronic meters which use a variable capacitor as a standard or reference for measuring the parameters of electrical components are presently limited to operation at frequencies of the order of 100 megacycles. When a variable reactance is used as a measurement standard at higher frequencies, the accuracy of measurements so obtained is decreased by the effects of lumped and distributed parameters such as parasitic capacitance, injection resistance and other undesirable factors that are inherent in the design of the standard. For example, a variable capacitor may contain significant amounts of series inductance and of contact resistance which may vary as a non-linear function of capacitance. In addition, such a capacitor may show spurious resonant responses at one or more operating frequencies. The use of such a device as a standard, in applications where accurate measurements must be made at very high frequencies, is thus not practical without the use of complex compensating mechanisms.

It is desirable to provide a variable capacitor in which the values of the inherent series inductance and contact resistance are negligibly small or are at least known so that suitable correction therefor can be provided. Unpredictable contact resistance can be eliminated by providing a capacitor having two sets of stator plates and a movable element variably located therebetween. The series inductance increases the effective value of capacitance for a given capacitor setting and should therefore be accurately controlled. If such inductance varies inversely with capacitance so that the product of inductance and capacitance remains constant, there results a constant percent difference between the capacitance setting and the effective capacitance. This percent difference or error can then be simply corrected by shifting the reference line on a logarithmic readout dial for any given operating frequency. In addition, if the constant value of the product of capacitance and inductance is properly chosen, the variable capacitor will show self-resonance at a single frequency that is much higher than the maximum operating frequency.

Accordingly, it is an object of the present invention to provide a variable capacitor in which the values of effective capacitance are related to the set values of capacitance within a known constant for all operating frequencies.

It is another object of the present invention to provide a variable capacitor in which the series inductance varies inversely with capacitance so that the product of capacitance and series inductance is a constant for all settings of capacitance.

It is still another object of the present invention to provide a variable capacitor which has a single resonant response at a frequency that is at least twice the maximum frequency of operation.

In accordance with the illustrated embodiment of the present invention, a variable capacitor is designed with two sets of stationary plates, each connected to a reference plane and having a set of movable plates adapted to move linearly between the sets of stationary plates. Sliding contact resistance is thereby eliminated. The shape of the capacitor plates are so designed that the inherent series inductance varies inversely with capacitance. Moreover, the shape of the movable plates are designed to provide logarithmically varying capacitance with translational movement. A further consideration included in the design of the capacitor plates is the requirement that the product of the capacitance and series inductance be substantially constant for all capacitor settings. The translational movement of the movable set of plates is coupled to a logarithmic read-out dial which is calibrated directly in capacitance. The actual capacitance, as measured at a very low frequency, is increased when operated at very high frequencies by the series inductance. The increased value of capacitance is called the effective capacitance. The percent difference or error between the set value of capacitance and the effective capacitance is thus compensated for by shifting the reference line on the read-out scale from which the value of capacitance is obtained.

Other and incidental objects of the present invention will be apparent from a reading of specification and an inspection of the accompanying drawing in which.

Figure 1:
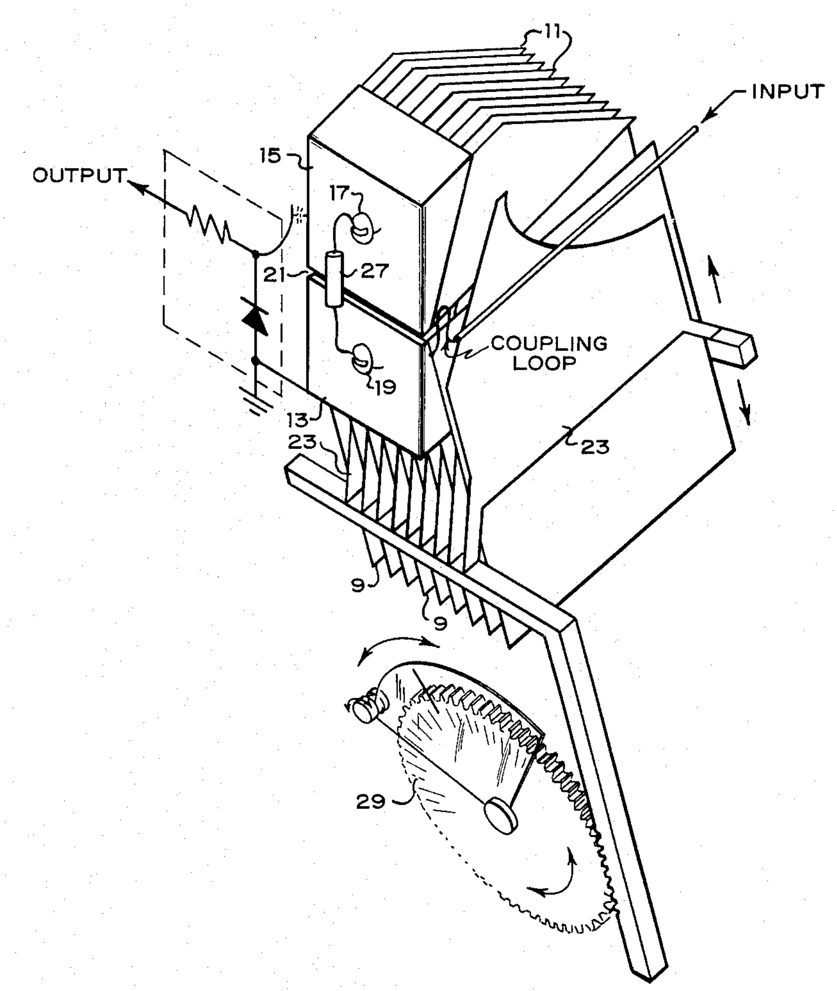
FIGURE 1 is a detailed pictorial view of the variable capacitor.
Figure 2:
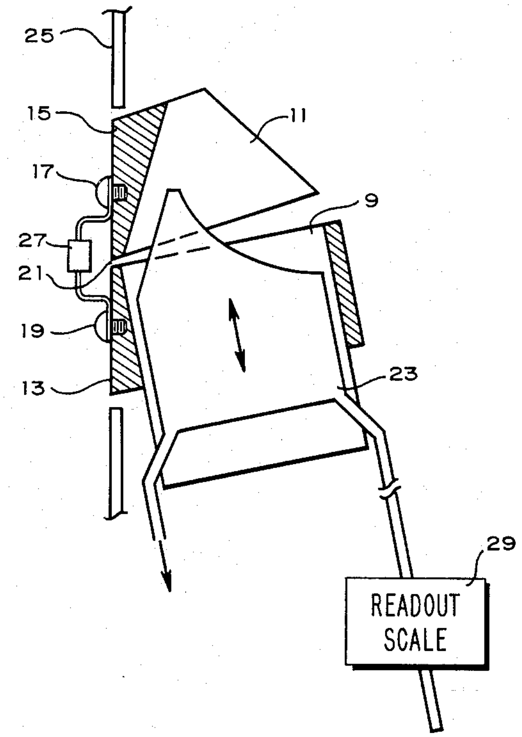
FIGURE 2 is a simplified sectional view of the variable capacitor according to the present invention.

Referring now to the drawing, there is shown a set of grounded stator plates 9 and a set of higher potential stator plates 11 connected to segments 13 and 15 of the reference plane, respectively. Mounting screws 17 and 19 are provided in each segment of the reference plane in place of conventional binding post terminals which produce unpredictable values of inductance. A small gap 21 is provided in the reference plane across which the component to be measured is connected. This gap has a diverging taper along the width dimension of the stator plates in order to reduce the distributed capacity between sets of stator plates. The movable plate or set of plates 23, called a translator, is adapted to move in the plane of the stator plates and to traverse the air gap therebetween. This motion, displaced approximately 20 degrees from the vertical reference, permits the translator plates to move toward the reference plane as capacitance increases, thereby decreasing the average internal path length and the resulting series inductance. The plates of the translator are shaped to provide a convenient logarithmic variation of capacitance with linear movement of the translator. Other mathematical relationships between capacitance and linear motion may be obtained by suitably shaping the plates of the translator.

The entire structure is suitably mounted with respect to the front panel 25 and is shielded from surrounding structures to prevent spurious resonant responses resulting from unpredictable parasitic reactances. A readout scale 29 is mechanically coupled to the translator 23 to provide an indication of the position of the translator and, hence, an indication of the capacitance setting.

The calibrated capacitance appears only at the reference plane. For this reason, the component 27 to be measured is mounted across the air gap 21 in close proximity with the surface plane of segments 13 and 15. The mean path length between the capacitor terminals decreases as the translator 23 advances toward stator plates 11, i.e., as the capacitance increases. The translator approaches the plane of reference at an angle of about 20 degrees. This tilting maintains the approach distance relatively small so that the inductance is kept low, and at the same time provides a heavier stator segments for attachment of components. The resulting self-resonant frequency of this device is maintained substantially constant at about 2000 megacycles where the operating frequencies are of the order of 600 megacycles.

Therefore, the capacitor of the present invention provides a direct reading variable reactance which is useful as a measurement standard at ultra-high frequencies. The capacitance varies logarithmically and therefore requires only a simple compensating arrangement such as a movable reference indicator on a readout scale to correct for the constant percent error between the set capacitance and the effective capacitance. In this manner, high calibration accuracy is maintained for all capacitor settings at a given operating frequency. In addition, since the self-resonant frequency is maintained substantially constant at a frequency that is much higher than the maximum operating frequency, the standard requires only one adjustment to compensate for this source of error. The variable capacitor of the present invention is thus well adapted for such applications as ultra-high frequency Q measurements and reactance substitution measurements where accurate calibration of a variable reactance is essential over a wide range of operating frequencies.

We claim:

1. A variable capacitor comprising first and second stator sections, each section having a plurality of stator plates mounted thereon, said stator sections being electrically insulated from each other, the first and second stator sections having surfaces which form a reference plane, connecting means on said surfaces of the first and second stator sections, a translator having at least one plate mounted thereon, mounting means supporting said translator for slidable movement thereof between the first and second sets of stator plates along an axis which is tilted at an acute angle with respect to the reference plane and which is disposed in a direction from the first set toward the second set of stator plates, the movement of said translator along said axis providing a signal path between the surfaces of said stator sections which has a mean path length that decreases as the distance traversed by said translator increases, a readout scale, a reference indicator for said scale which is selectably positionable along said scale, and means coupling said readout scale to said translator for transmitting the movement thereof to said readout scale, the reference indicator for the readout scale being adapted to provide an adjustable indication of the capacitance of said capacitor.

2. A variable capacitor for operation at high frequencies, said capacitor comprising first and second stator sections, each section having at least one stator plate mounted thereon, said stator sections being electrically insulated from each other and being separated by an air gap, the first and second stator sections having surfaces which form a reference plane, said air gap having a dimension between the first and second stator sections that increases with distance from said reference plane, connecting means on said surfaces for making electrical connections to the first and second stator sections, a translator having at least one plate mounted thereon, mounting means supporting said translator for slidable movement thereof between the first and second sets of stator plates along an axis which is displaced twenty degrees from said reference plane and which is disposed in a direction from the first set toward the second set of stator plates, the movement of the translator alongs said axis varying the capacitance of said capacitor and varying the series inductance of said capacitor inversely with capacitance thereof such that the product of said series inductance and capacitance is a substantially constant resonant frequency, means connecting the first stator section and the translator to a source of reference potential, means to apply an input signal to the second stator section, a readout scale and a reference indicator therefor, and means coupling said readout scale to said translator for transmitting the movement thereof to said readout scale, the reference indicator for the readout scale being adapted to provide an indication of the capacitance of said capacitor as a function of position of the translator.

3. Signal apparatus comprising first and second stator sections, each section having a plurality and stator plates mounted thereon, said stator sections being electrically insulated from each other, the first and second stator sections having surfaces which form a reference plane, a translator having a plurality of plates mounted thereon, mounting means supporting said translator for slidable movement thereof between the first and second sets of stator plates along an axis which is tilted at an acute angle with respect to the reference plane and which is disposed in a direction from the first set toward the second set of stator plates, the movement of said translator along said axis providing an alternating signal path between said surfaces of said stator sections which has a mean path length between said surfaces of the stator sections that decreases as the distance traversed by the translator toward the second set of stator plates increases.

References Cited by the Examiner

UNITED STATES PATENTS

| | | | |
|---|---|---|---|
| 1,728,834 | 9/29 | Langley | 317—254 |
| 1,738,194 | 12/29 | Morris | 317—251 |
| 2,881,372 | 4/59 | Dublier | 317—249 |

FOREIGN PATENTS

| | | |
|---|---|---|
| 290,900 | 12/31 | Italy. |

JOHN F. BURNS, *Primary Examiner.*

JOHN P. WILDMAN, LARAMIE E. ASKIN, *Examiners.*